Dec. 4, 1934.  A. FOSS  1,983,024
TREATMENT OF CRUDE PHOSPHATES
Filed May 20, 1933
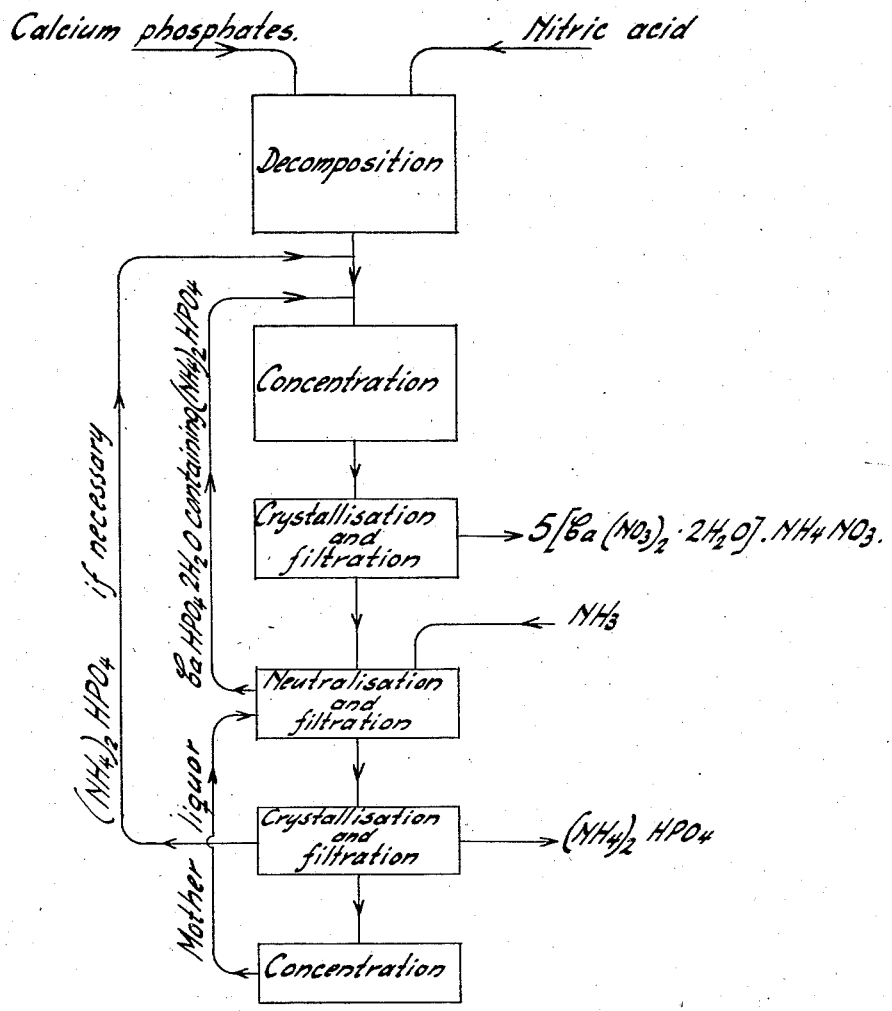
Antonius Foss
By
Attorneys Patented Dec. 4, 1934

1,983,024

UNITED STATES PATENT OFFICE 1,983,024

TREATMENT OF CRUDE PHOSPHATES

Antonius Foss, Oslo, Norway, assignor to Norsk Hydro-Elektrisk Kvaelstofaktieselskab, Oslo, Norway Application May 20, 1933, Serial No. 672,048
In Norway May 21, 1932

5 Claims. (Cl. 71—7)

My invention relates to the treatment of crude phosphates for the purpose of obtaining phosphate manure and other phosphate compounds, and, moreover, products in the form of double compounds useful as phosphate manure and other phosphate compounds.

Soluble phosphates which can be utilized as manure products may be obtained from crude phosphates by dissolving the crude phosphates in nitric acid and then adding nitrate of ammonia in such proportions that the calcium is thus deposited as a double compound: calcium nitrate-ammonium nitrate, after which the solution, containing mainly phosphoric acid forms the basis for the manufacture of said valuable products.

My invention has for its object a more profitable method of carrying out such process and the main point in the present invention is using phosphate of ammonia as a precipitant instead of nitrate of ammonia. The use of phosphate of ammonia for this purpose is a great advantage because it is obtained in considerable quantities during the process, and by conducting part of this product back to the solution obtained from the crude phosphate treatment, it replaces the nitrate of ammonia in an economically advantageous manner and without having any detrimental influence on the working of the process as a whole.

A flow sheet of a process according to my invention is shown in the accompanying drawing which is made a part of this application and which will be more fully explained by the following detailed description of the process.

For illustrating the course of the process as regards the chief products (the treatment of the iron contained in the crude phosphate etc. can be carried out in the usual way), the following equations may be given:

(1)  $2Ca_3(PO_4)_2 + 12HNO_3 \rightarrow 6Ca(NO_3)_2 + 4H_3PO_4$
(2)  $6Ca(NO_3)_2 + NH_4H_2PO_4 + HNO_3 + 10H_2O \rightarrow$
     $5[Ca(NO_3)_2.2H_2O].NH_4NO_3 + H_3PO_4 + Ca(NO_3)_2$
(3)  $5H_3PO_4 + Ca(NO_3)_2 + 6NH_3 \rightarrow$
     $CaHPO_4 + 4NH_4H_2PO_4 + 2NH_4NO_3$ The double salt 5

$[Ca(NO_3)_2.2H_2O].NH_4NO_3$ which is formed according to Equation (2) is immediately deposited if sufficiently strong nitric acid has been used for the actual solution process according to Equation (1). Otherwise the solution is evaporated after adding the phosphate of ammonia, and the double salt is then deposited during or after the evaporation. The double salt is filtered out, after which ammonia is added, so that a calcium and iron phosphate is deposited, (Equation (3)).

It has been proved that this deposit may contain considerable quantities of phosphate of ammonia. This quantity of phosphate of ammonia is large enough for carrying out the process. It is therefore an important step in my invention to cause the entire deposit to be returned to the vessel in which the decomposition of the crude phosphate with nitric acid takes place. The addition of this deposit may take place before, during or after the dissolution of the crude phosphate in the nitric acid.

If this process is followed and it should prove that the deposit contains too much phosphate of ammonia, it may be washed with water; if it contains too little, phosphate of ammonia may be added before it is sent back to the decomposition vessel.

As it appears that even according to the present processes a complete separation of the calcium in the form of double salts cannot be obtained, this may be remedied—before the addition of ammonia—by using the method of the German Patent No. 337,154, viz. by adding a somewhat stronger nitric acid, by which the remainder or greater part of the remainder of the calcium is deposited as a double salt. The excess of nitric acid is thereupon removed by subjecting the solution to a process of denitration, viz., a distillation, whereby air or steam may be blown into the liquid to accelerate the evaporation of the nitric acid. Instead of blowing air or steam into the solution, vacuum distillation similar to the well known Valentiner process may be used. (See, for example, Lunge & Cumming, "Manufacture of Acids and Alkalis," vol. 6, "Nitric Acid and Nitrates", A. Cottrell, pp. 80–81, 130, 251–268.)

The process herein above described gives the following advantages: The phosphate of ammonia which is used as a means of precipitation is obtained as one of the chief products in the actual process. The solutions obtained become less viscous because there is more phosphoric acid in circulation. Besides this, it is an advantage that large quantities of nitrate of ammonia are avoided in the final products, as large quantities of the same cause difficulties when working to obtain final products of a certain composition.

I claim:
1. In the treatment of crude phosphates using nitric acid as dissolving agent and depositing the lime in the form of a double compound, the process which consists in first dissolving the raw material in nitric acid and then adding phosphate of ammonia, thereby precipitating lime in the form of a double salt of calcium nitrate and ammonium nitrate.

2. In the treatment of crude phosphates using nitric acid as dissolving agent and depositing the lime in the form of a double compound the process which consists in first dissolving the raw material in nitric acid then adding phosphate of ammonia thereby precipitating lime in the form of a double salt of calcium nitrate and ammonium nitrate, neutralizing the remaining solution with ammonia, thereby precipitating the remainder of the calcium and iron in the form of phosphates.

3. In the treatment of crude phosphate using nitric acid as dissolving agent and depositing the lime in the form of a double compound the process which consists in first dissolving the raw material in nitric acid then adding phosphate of ammonia thereby precipitating lime in the form of a double salt of calcium nitrate and ammonium nitrate, neutralizing the remaining solution with ammonia, thereby precipitating the remainder of the calcium and iron in the form of phosphates, and finally returning quantities of phosphate of ammonia contained in the deposit to the first stage of the process.

4. In the treatment of crude phosphates using nitric acid as dissolving agent and depositing the lime in the form of a double compound the process which consists in first dissolving the raw material in nitric acid then adding phosphate of ammonia thereby precipitating lime in the form of a double salt of calcium nitrate and ammonium nitrate, adding an excess of nitric acid thereby depositing further quantities of the double salt, denitrating the solution and neutralizing the same with ammonia, thereby precipitating the remainder of the calcium and iron in the form of phosphates.

5. In the treatment of crude phosphates using nitric acid as dissolving agent and depositing the lime in the form of a double compound the process which consists in first dissolving the raw material in nitric acid then adding phosphate of ammonia thereby precipitating lime in the form of a double salt of calcium nitrate and ammonium nitrate, adding an excess of nitric acid thereby depositing further quantities of the double salt, denitrating the solution and neutralizing the same with ammonia, thereby precipitating the remainder of the calcium and iron in the form of phosphates and finally returning the calcium and iron phosphate deposit and the phosphate of ammonia therein contained to the first stage of the process.

ANTONIUS FOSS.